(12) United States Patent
Ganesan

(10) Patent No.: US 10,305,886 B1
(45) Date of Patent: May 28, 2019

(54) TRIPLE BLIND IDENTITY EXCHANGE

(71) Applicant: Ravi Ganesan, San Diego, CA (US)

(72) Inventor: Ravi Ganesan, San Diego, CA (US)

(\*) Notice: Subject to any disclaimer, the term of this patent is extended or adjusted under 35 U.S.C. 154(b) by 97 days.

(21) Appl. No.: 15/164,776

(22) Filed: May 25, 2016

Related U.S. Application Data

(60) Provisional application No. 62/166,721, filed on May 27, 2015.

(51) Int. Cl.
*H04L 9/32* (2006.01)
*G06Q 50/22* (2018.01)
*H04L 29/06* (2006.01)

(52) U.S. Cl.
CPC ........ *H04L 63/0823* (2013.01); *G06Q 50/22* (2013.01); *H04L 9/3268* (2013.01); *H04L 63/0421* (2013.01); *H04L 63/0428* (2013.01); *H04L 63/061* (2013.01); *H04L 63/0815* (2013.01)

(58) Field of Classification Search
CPC ............. H04L 63/0823; H04L 9/3268; H04L 63/0815; H04L 63/0421; H04L 63/061; H04L 63/0428; G06Q 50/22
See application file for complete search history.

(56) References Cited

U.S. PATENT DOCUMENTS

| | | | | |
|---|---|---|---|---|
| 2002/0004900 A1* | 1/2002 | Patel | ................ | G06Q 30/02 713/155 |
| 2005/0283608 A1* | 12/2005 | Halcrow | ............ | G06Q 20/3674 713/175 |
| 2007/0101145 A1* | 5/2007 | Sachdeva | ............ | H04L 63/0815 713/176 |
| 2007/0242830 A1* | 10/2007 | Conrado | ............... | H04L 63/065 380/285 |
| 2007/0288750 A1* | 12/2007 | Camenisch | ............. | G06F 21/33 713/168 |
| 2008/0052772 A1* | 2/2008 | Conrado | ............. | G06F 21/6254 726/10 |
| 2009/0089870 A1* | 4/2009 | Wahl | ................... | H04L 63/0823 726/9 |
| 2010/0146603 A1* | 6/2010 | Lee | ..................... | H04L 63/0407 726/6 |
| 2010/0325441 A1* | 12/2010 | Laurie | ..................... | G06F 21/31 713/185 |
| 2011/0013771 A1* | 1/2011 | Camenisch | ........... | H04L 9/3252 380/46 |

(Continued)

OTHER PUBLICATIONS

Menezes, A. et al., "Handbook of Applied Cryptography", 1997 by CRC Press, Inc., p. 508. (Year: 1997).*

(Continued)

*Primary Examiner* — Michael Pyzocha
(74) *Attorney, Agent, or Firm* — Sughrue Mion, PLLC

(57) ABSTRACT

An Identity Exchange that communicates and processes data exchanged between Identity Providers (IdP) and Relying Partys (RP) remains blinded from the attribute values of the data flowing through it. To make this happen each IdP and RP are issued anonymous certificates by a Certificate Authority, using which they perform key exchange with each other to exchange session keys, which are used subsequently to encrypt/decrypt all attribute values they exchange via the Identity Exchange.

7 Claims, 2 Drawing Sheets

(56) References Cited

U.S. PATENT DOCUMENTS

| | | | |
|---|---|---|---|
| 2011/0202991 A1* | 8/2011 | Paquin | H04L 9/3213 726/9 |
| 2012/0311330 A1* | 12/2012 | Zhang | H04L 63/0815 713/168 |
| 2014/0007198 A1* | 1/2014 | Durbha | H04L 63/102 726/4 |
| 2014/0201820 A1* | 7/2014 | Li | H04L 63/08 726/4 |
| 2014/0281491 A1* | 9/2014 | Zaverucha | H04L 9/321 713/155 |
| 2015/0281344 A1* | 10/2015 | Grootwassink | H04L 67/104 713/168 |
| 2015/0332029 A1* | 11/2015 | Coxe | H04L 63/0815 726/9 |
| 2017/0155515 A1* | 6/2017 | Androulaki | H04L 9/3263 |
| 2017/0250972 A1* | 8/2017 | Ronda | H04L 9/08 |
| 2018/0254907 A1* | 9/2018 | Gasparini | H04L 9/3255 |

OTHER PUBLICATIONS

Trust Framework—Securekey Concierge in Canada, SK-UN117, Revision: 1.0, Sep. 9, 2015, pp. 1-17. (Year: 2015).*

* cited by examiner

Figure – 1: Prior Art

TRIPLE BLIND IDENTITY EXCHANGE

RELATED APPLICATIONS

This application claims priority based on Provisional U.S. Application Ser. No. 62/166,721 filed May 27, 2015, and entitled "A NEW DESIGN FOR A TRIPLE BLIND IDENTITY EXCHANGE_", the contents of which are incorporated herein in their entirety by reference.

TECHNICAL FIELD

This invention relates to security and privacy. Specifically it relates to a method to provide a triple blinded identity broker that can be used in identity federations.

BACKGROUND OF THE INVENTION

If a user Alice wishes to access her patient portal at her medical provider, she typically has to obtain unique credentials (e.g. UserID/Password) for the patient portal. However, Alice typically would also have credentials from other sites, such as those for her on-line banking site or those from her employer. The notion that can Alice can leverage the credential issued by one entity to access another entity is the concept of an identity federation. The technology and standards for achieving identity federations have existed in various forms for many decades. Standards such as SAML and OpenID have similarly been in existence for a long time. In terms of adoption such cross-organization identity federation has not seen widespread adoption. Rather the technology (sometimes called single sign-on or SSO) is used more widely within a given organization to allow users to use a single credential to access multiple services. There are several reasons why cross organizational identity federations have been slow to be adopted. First, there is the "n squared connections" problem wherein for n organizations to cooperate in a federation about squared connections will have to be maintained. Further, while there is standardization happening, there still exist multiple standards, and even the implementation of a given standard can have variability.

Identity Exchanges have started appearing as a potential solution to some of these problems. As shown in FIG. 1 an Identity Exchange (110) acts as a "switchboard" between the various entities (121, 122, 123, . . . 131, 132, 133, . . . ) in the federation. The entities provided identity assertions are referred to as Identity Providers (IdP) and the entities consuming identity assertions are referred to as Relying Parties (RP). In a typical flow the user (100) visits the RP (say 131) site, is prompted to select the IdP (say 121) they wish to use to log in and is redirected to the IdP via the Identity Exchange (110) with a identity assertion request. The IdP authenticates the user, creates a response consisting of an identity assertion and the user is directed back to the RP via the Identity Exchange. In this model each IdP and RP has to maintain a single connection to the Identity Exchange solving the "n squared" problem. Further, the Identity Exchange can perform protocol translations and allow for interoperability There is a further problem which identity federations can help solve, namely, in our description above when Alice selects the IdP she wants to use, the RP learns the name of that IdP. Further, when the IdP provides the response it learns which RP Alice is visiting. To bring it back to our original example, if Alice user her on-line banking credential to log in to her patient portal at her health clinic, then the health clinic learns where she banks, and the bank knows which health clinic she is visiting. In some cases this can result in an unacceptable loss of privacy. To solve this issue the notion of double blinded Identity Exchanges were introduced and are currently used in some countries for government run Identity Exchanges. Here the Identity Exchange acts as a middleman which shields the true identity of the IdP from the RP and that of the RP from the IdP.

The central problem with Identity Exchanges is that the exchange itself becomes a single point through which all traffic flows and a security failure at the exchange itself will be catastrophic. For a comprehensive description of the importance of this problem the interested reader is referred to "Privacy Enhanced Identity Brokers", published on Oct. 19, 2015 by the National Cyber Security Center of Excellence a part of the National Institute of Standards and Technology (NIST). See https://nccoe.nist.gov/sites/default/files/library/project-descriptions/privacy-enhanced-identity-brokers-project-description-draft.pdf.

OBJECTIVES OF THE INVENTION

This invention has the following objectives:
Develop a new type of triple blinded Identity Exchange which does is not vulnerable to catastrophic failure.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with aspects of the present invention, an Identity Exchange that communicates and processes data exchanged between Identity Providers (IdP) and Relying Partys (RP) remains blinded from the attribute values of the data flowing through it. To make this happen each IdP and RP are issued anonymous certificates by a Certificate Authority, using which they perform key exchange with each other to exchange session keys, which are used subsequently to encrypt/decrypt all attribute values they exchange via the Identity Exchange.

In accordance with aspects of the present invention the anonymous certificates used above may be short lived.

In accordance with aspects of the present invention the anonymous certificates used above may be obtained using long lived certificates In accordance with aspects of the present invention the key exchange and encryption/decryption described above is performed on a proxy server that may be located in a cloud service, on the same premises as the IdP/RP or integrated directly into the IdP/RP software.

In accordance with aspects of the present invention the Identity Exchange can carry out its normal functions such as format translation using the metadata which is visible to it.

In accordance with aspects of the present invention format preserving encryption is chosen as the encryption/decryption method.

PREFERRED EMBODIMENT(S) OF THE INVENTION

Figure 1:
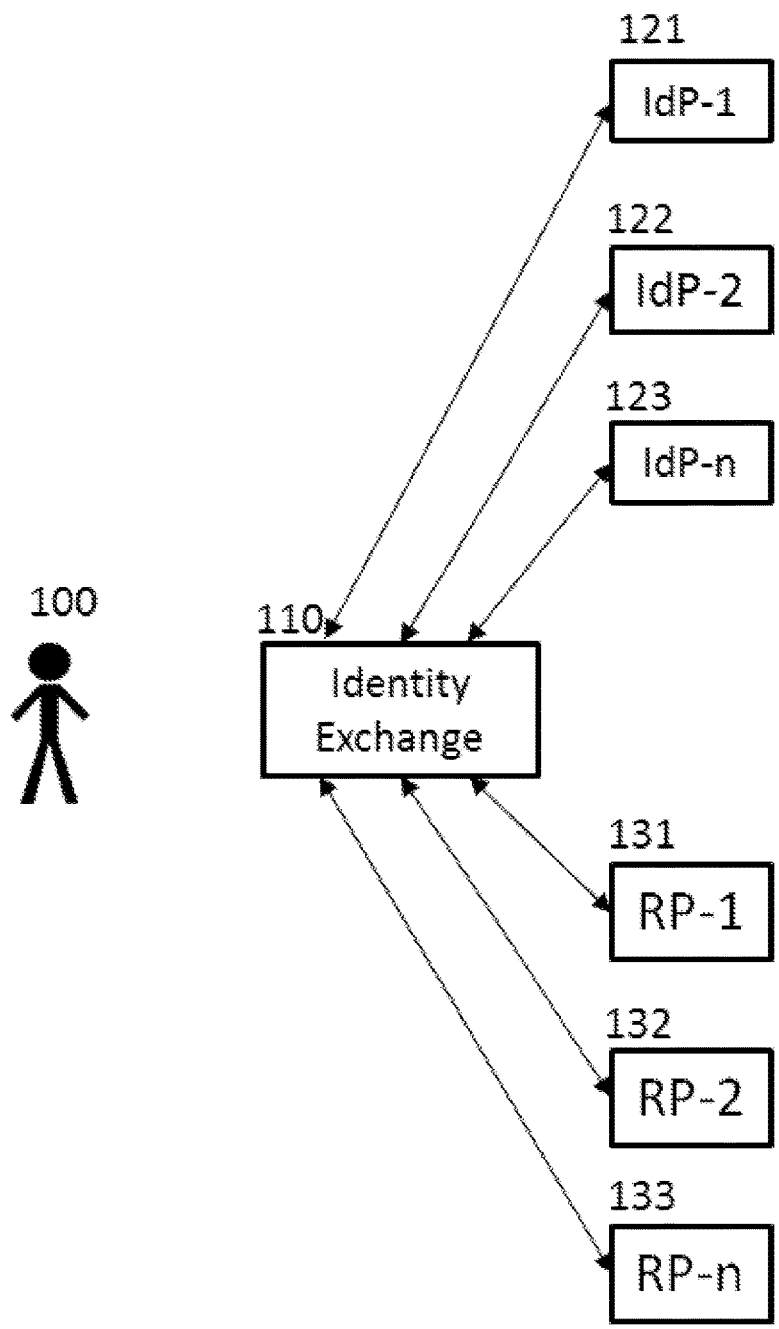
FIG. 1 shows a typical identity federation with an Identity Exchange and FIG. 2 shows an identity federation with the addition of triple blinding proxies.
Figure 2:
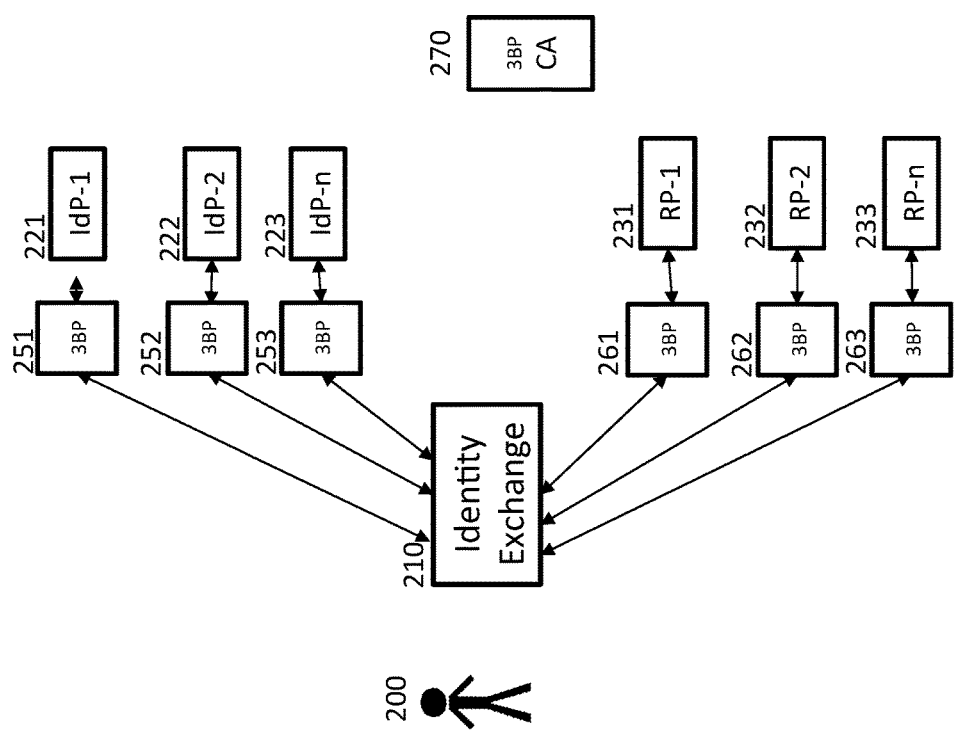

Our preferred embodiment takes the components of a typical Identity Exchange scenario (as shown in FIG. 1) and augments them with triple blinding proxies (3BP) and a certificate authority (3BP CA) as shown in FIG. 2. We describe the architecture and then the processes for key exchange and encryption.

Architecture

As shown in FIG. 2, the system architecture consists of a triple blind proxy layer (251, 252, 253) between each IdP (221, 222, 223) and the Identity Exchange (210), and similarly (261, 262, 263) between each RP (231, 232, 233) and the Identity Exchange (210).

We note the following:

All federation requests (requests to confirm user's identity from RP to Identity Exchange to IdP) and assertions (responses confirming or denying user's identity from IdP to Identity Exchange to RP) are proxied through the 3BP layer.

The IdP and RP themselves can be unaware of the existence of the 3BP proxy.

Similarly the Identity Exchange software can be unaware of the existence of the 3BP proxy.

The 3BP service could be run by a cloud service provider (separate from the Identity Exchange), could be run separately at each IdP and RP site, or could eventually even be integrated into the IdP and RP software.

An additional important component introduced into the architecture is the presence of a Certificate Authority we term the 3BP CA (270) which participates in the issuance of anonymous short lived certificates to the 3BP instances as follows:

Each 3BP instance has a valid long lived private key, and a valid long lived certificate issued on behalf of the IdP or RP it represents.

Each instance then uses the long lived certificate to authenticate to the 3BP CA using a protocol such as mutual SSL, and having done so generates a fresh Certificate Signing Request (CSR) with a short lived validity (e.g. a day), and uses it to receive from the 3BP CA an anonymous short lived certificate.

Key Exchange

Each of the IdPs and RPs perform a secure key exchange via the Identity Exchange with each other in the encryption stage. We note the following:

Any secure key exchange protocol can be used; our invention does not rest on the particular protocol used. It is however critical that the protocol be considered safe against Man in the Middle (MITM) attacks as the Identity Exchange is in effect acting as a MITM.

The key exchange is facilitated using the anonymous certificates, ensuring that the key exchange does not result in the IdP and RP learning each other's identity.

The protocol can be initiated at pre-determined times, or initiated as needed or some combination of both.

At the end of the process each IdP and RP pair share a key (called a session key) which is not known to the Identity Exchange.

Encryption

As data flows between an IdP and an RP via the Identity Exchange the key (session key) exchanged using the Key Exchange process described above is used to encrypt and decrypt all attribute values. We note the following:

Encryption is happening at the application level and therefore the meta data is not automatically encrypted. For e.g. in NAME=ALICE only the attribute "ALICE" is encrypted, whereas the metadata "NAME=" is not encrypted.

The Identity Exchange can use the metadata to perform all its customary functions, including format translation.

If needed, format preserving encryption can be used.

The result is that the Identity Exchange does not see any of the attribute values flowing in between the IdP and RP and does not even know the name of the user.

What is claimed is:

1. A method comprising:
performing a secure key exchange between an Identity Provider (IdP) and a Relying Party (RP); and
proxying, on the front end, all federation requests from the RP and assertions from the IdP through a triple blind proxy (3BP) layer, wherein
  each of the federation requests include a request to confirm a user's identity,
  each of the assertions are responses confirming or denying a user's identity, and
  to keep the IdP and the RP blinded to the values of exchanged attributes:
    the IdP and the RP are each issued anonymous certificates by a Certificate Authority,
    the IdP and the RP use the issued anonymous certificates to conduct a key exchange protocol to exchange session keys periodically or on an as needed basis, and
    the secure key exchange between the IdP and the RP includes the IdP and the RP using a session key to encrypt and/or decrypt the values of the attributes that are to be communicated between the IdP and the RP so that an Identity Exchange through which the data flows and is processed is blinded from the values of the exchanged attributes.

2. The method according to claim 1, wherein the anonymous certificates issued to the IdP and the RP are short-lived, so as to be valid for one day or less.

3. The method according to claim 1, wherein the IdP and the RP obtain the anonymous certificates using long-lived certificates from a Certificate Authority that are valid from one to three years.

4. The method according to claim 1, wherein the functionality for performing the secure key exchange and encryption/decryption is performed on a proxy server that may be located in a cloud service, on the same premises as the IdP/RP or integrated directly into the IdP/RP software.

5. The method according to claim 1, wherein the Identity Exchange carries out normal functions using metadata that is visible to it.

6. The method according to claim 1, wherein format preserving encryption is used as the encryption/decryption method.

7. The method according to claim 1, wherein each instance uses the long lived certificate to authenticate to the 3BP Certificate Authority using mutual SSL, and having done so generates a fresh Certificate Signing Request (CSR) with a short lived validity, and uses it to receive from the 3BP CA an anonymous short lived certificate.

* * * * *